United States Patent [19]

Neuerburg

[11] 4,426,828
[45] Jan. 24, 1984

[54] MOWER HAVING AN IMPROVED CUTTER BAR

[75] Inventor: Horst Neuerburg, Haegen, France

[73] Assignee: Kuhn S.A., Saverne, France

[21] Appl. No.: 330,271

[22] Filed: Dec. 14, 1981

[30] Foreign Application Priority Data

Dec. 19, 1980 [FR] France ................. 80 27569

[51] Int. Cl.³ .......................................... A01D 55/18
[52] U.S. Cl. ........................................ 56/13.6; 56/6
[58] Field of Search ............... 56/13.6, 6, 17.2, 192

[56] References Cited

U.S. PATENT DOCUMENTS

| | | | |
|---|---|---|---|
| 3,513,648 | 5/1970 | Kline et al. | 56/13.6 |
| 3,524,306 | 8/1970 | Reber | 56/13.6 |
| 3,604,185 | 9/1971 | Reber et al. | 56/6 |
| 4,103,476 | 8/1978 | Oosterling et al. | 56/13.6 |
| 4,149,359 | 4/1979 | van der Lely | 56/13.6 |
| 4,183,196 | 1/1980 | Oosterling et al. | 56/13.6 |
| 4,188,773 | 2/1980 | Kaetzel | 56/6 |
| 4,201,033 | 5/1980 | Meek et al. | 56/13.6 |
| 4,215,526 | 8/1980 | van der Lely | 56/192 |
| 4,304,088 | 12/1981 | Werner | 56/13.6 |

*Primary Examiner*—Paul J. Hirsch
*Attorney, Agent, or Firm*—Ernest F. Marmorek

[57] ABSTRACT

A mower having a casing, several disks located above the casing and bearing block means supported by the casing, and furthermore having a plate secured to the bearing block means and skid means connected to the plate for protecting the disks.

13 Claims, 4 Drawing Figures

MOWER HAVING AN IMPROVED CUTTER BAR

The present invention relates to a disk mower having a sealed casing which contains a lubricant and in which a plurality of movement transmitting elements are housed for the purpose of driving disks located above said casing from below.

Each disk is fitted with at least one cutting tool and is guided in its rotation by a disk bearing block.

In operation, the casing of such a mower slides over the ground by means of disk-protecting skids so as to cut the forage as short as possible, while avoiding interference between the disks and obstacles such as bumps in the ground or stones for example.

Generally, these disk-protecting skids are fixed directly to the front part of the casing.

The drawback of such an arrangement is that the shocks sustained by each disk-protecting skid are only absorbed by the area in which the latter is fixed on the casing.

Thus, important and/or repeated shocks can cause cracking of the casing in these areas and lead to serious problems with the sealing of said casing.

To overcome this drawback, the mower in accordance with the present invention has a plate to which the disk-protecting skids are connected, said plate being fixed to at least one disk bearing block.

Thus, the shocks sustained by the disk-protecting skids are no longer borne by the front part of the casing with the risk of causing it to crack.

In accordance with one preferred variant of the invention, it is highly advantageous if said plate extends substantially over the entire length of the casing and is fixed to a large number of disk bearing blocks.

Thus, a shock sustained by any one of the disk-protecting skids is absorbed by all the disk bearing blocks to which the plate is fixed.

Moreover, the fact that the plate extends over the entire length of the cutter bar makes a very effective contribution to the rigidity of the latter and thus limits the flexing of the casing which produces rapid wear in the transmission elements housed inside said casing.

In accordance with another preferred variant of the invention, the plate extends under the lower face of the casing.

This feature of the invention is particularly advantageous because this arrangement allows effective protection of the underside of the casing which moves close to the ground when the mower is in operation.

Without this plate, the underside of the casing would be subject to almost constant rubbing and sustain wear which could lead to leakages of lubricant.

In accordance with further features of the invention, the plate also substantially covers the leading edge of the casing and has, in the zones between two neighbouring disks, scrapers preventing accumulations of earth which might impair mowing performance.

Thus, said plate and its fittings act as wearing parts and can be replaced easily and cheaply by any operator whereas the replacement of a casing is a lengthy and onerous operation which has to be carried out by a specialist.

Further features and advantages of the invention will become apparent in the following description, which is no way limiting, of one embodiment of the invention and with reference to the attached drawings in which.

Figure 1:
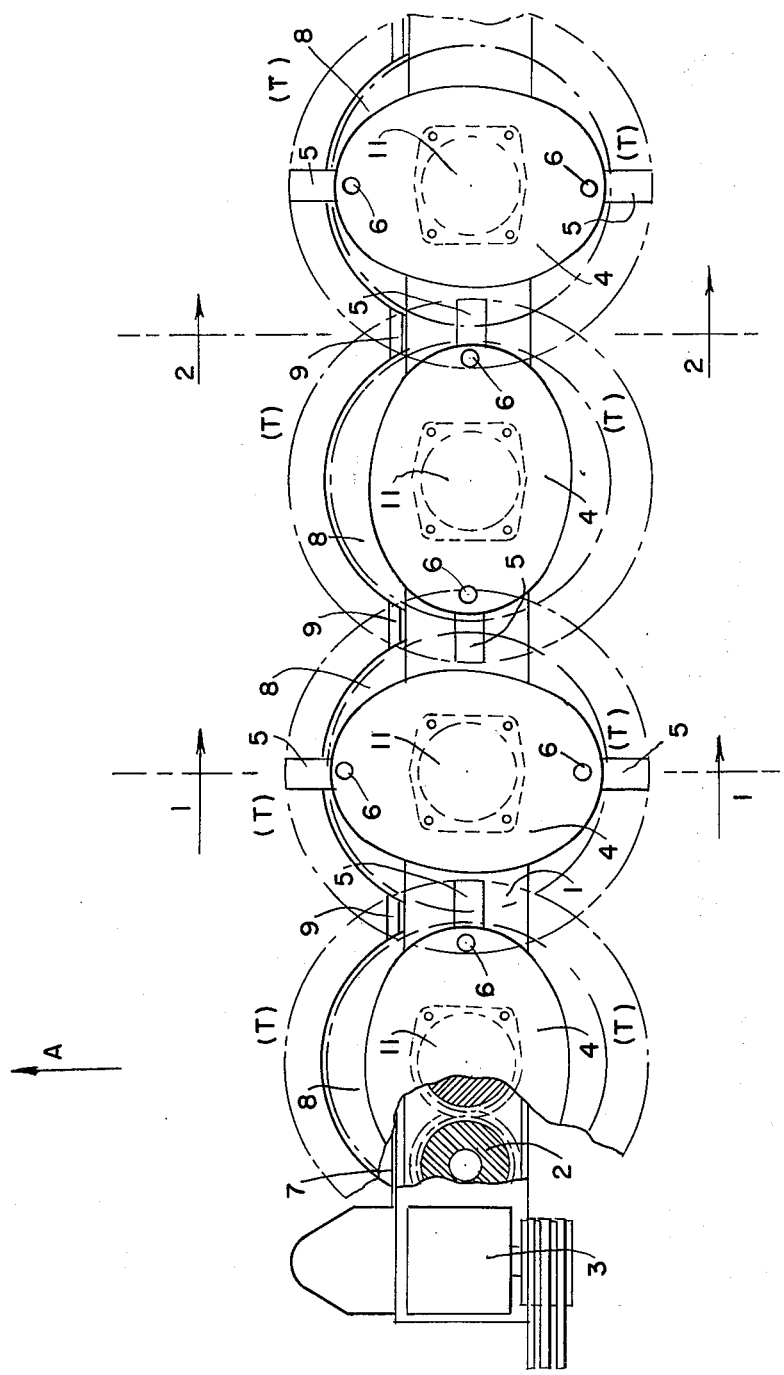
FIG. 1 is a top view of a disk mower in accordance with the invention.

In FIG. 1, the mower in accordance with the invention has a casing (1) housing a series of gears (2) driven so as to rotate from the power take-off of a tractor (not shown) by a known mechanism (3) such as an angle drive unit, pulleys and belts, for example. The gears (2) drive disks (4) fitted with two diametrically opposed knives (5) capable of turning freely about spindles (6) provided in the disks (4). The knives (5) are held in their working position under the influence of the centrifugal force and therefore follow circular paths (T) when the disks (4) are made to rotate. A plate (7) fixed to the disk bearing blocks (11) extends over the leading edge and under the lower face of the casing (1).

Disk-protecting skids (8) are fixed on this plate. At the front, viewed in the direction of the arrow A, these exhibit a circular sector having a radius which is greater than the radius of the paths (T') followed by the disks (4) but smaller than the radius of the paths (T) followed by the knives (5). As a result, the disks (4) are protected against any obstacle that might be presented by the ground over which the mower is operating. The knives (5) alone are not protected against shocks, but, as these are mounted freely on the disks (4) by means of the spindles (6), they can easily swing back under the disks (4) and reassume their working position as soon as the obstacle is passed.

Scrapers (9), preventing accumulations of earth which could impair mowing performance, are provided on the plate (7) in the zones between two neighbouring disks (4).

These scrapers (9) extend in front of said plate (7) in the direction of forward movement of the mower indicated by the arrow A and over a length such that they join at least two neighbouring disk-protecting skids (8).

Figure 2:
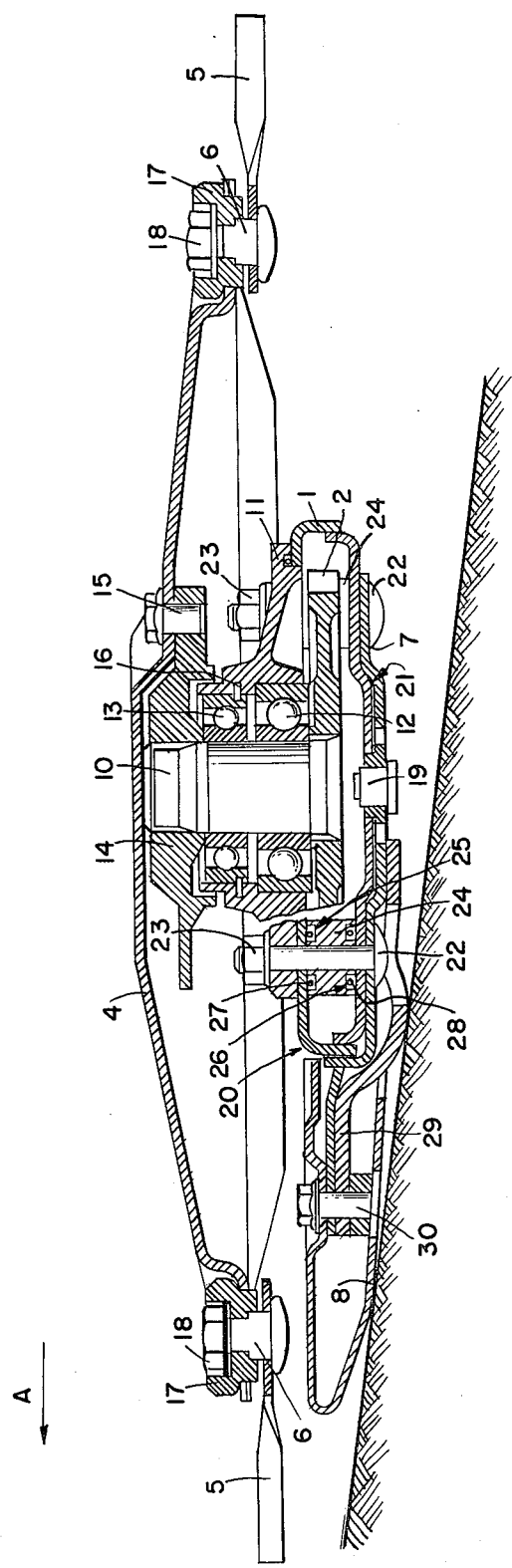
FIG. 2 is a sectional view of the casing in the vertical plane containing the axis I—I defined in FIG. 1.

In FIG. 2, it can be seen that the gear (2) housed in the casing (1) is integral with a shaft (10) guided in its rotation in a disk bearing block (11) by means of bearings (12 and 13). The upper part of the shaft (10) is rigidly connected to an entrainment means (14) on which the disk (4) is fixed by means of four screws (15) only one of which is shown. The assembly comprising the gear (2), shaft (10), bearing (12), bearing (13) and entrainment means (14) is held axially in the disk bearing block (11) by means of a circlip (16). Two rings (17), in which the spindles (6) securing the knives (5) are located, are welded to the periphery of the disk (4) at diametrically opposed points. These spindles are secured in the rings (17) by means of the nuts (18). The threaded plug (19) fixed underneath the casing (1) serves as a drain plug for the lubricant contained in the casing (1).

A plate (7), which covers the leading edge (20) and the underside (21) of the casing (1), extends under the casing (1). In this way, the rigidity of the casing (1) is advantageously augmented and its leading edge (20) and its underside (21) are protected against any obstacle that might come between two neighbouring disk-protecting skids (8) to prevent wear.

The plate (7) is advantageously fixed to the disk bearing blocks (11) by four fixing means on each bearing block only one of which is shown, in section, in FIG. 2, each comprising a screw (22) and a nut (23). Inside the casing (1) bracing elements (24) exhibiting the form of cylindrical tube through which the screws (22) pass, make it possible to obtain a very rigid connection between the plate (7) and the disk bearing blocks (11) while enabling the casing (1) to extend between these two types of parts. The upper and lower faces of the bracing elements (24) are provided with grooves (25 and 26) in which means (27 and 28) are introduced, such as O-rings for example, to seal the casing (1). In accordance with one embodiment of the invention, the bracing elements (24) can be constituted by a synthetic material with slight flexibility. Then, the bracing elements (24) themselves would seal the casing (1) when the screws (22) and nuts (23) were tightened.

Supports (29) to which disk-protecting skids (8) are fixed by means of screws (30), are welded to the front of the plate (7) underneath each disk (4). In accordance with another embodiment, the disk-protecting skids (8) can be permanently secured to the plate (7), by welding for example.

Figure 3:
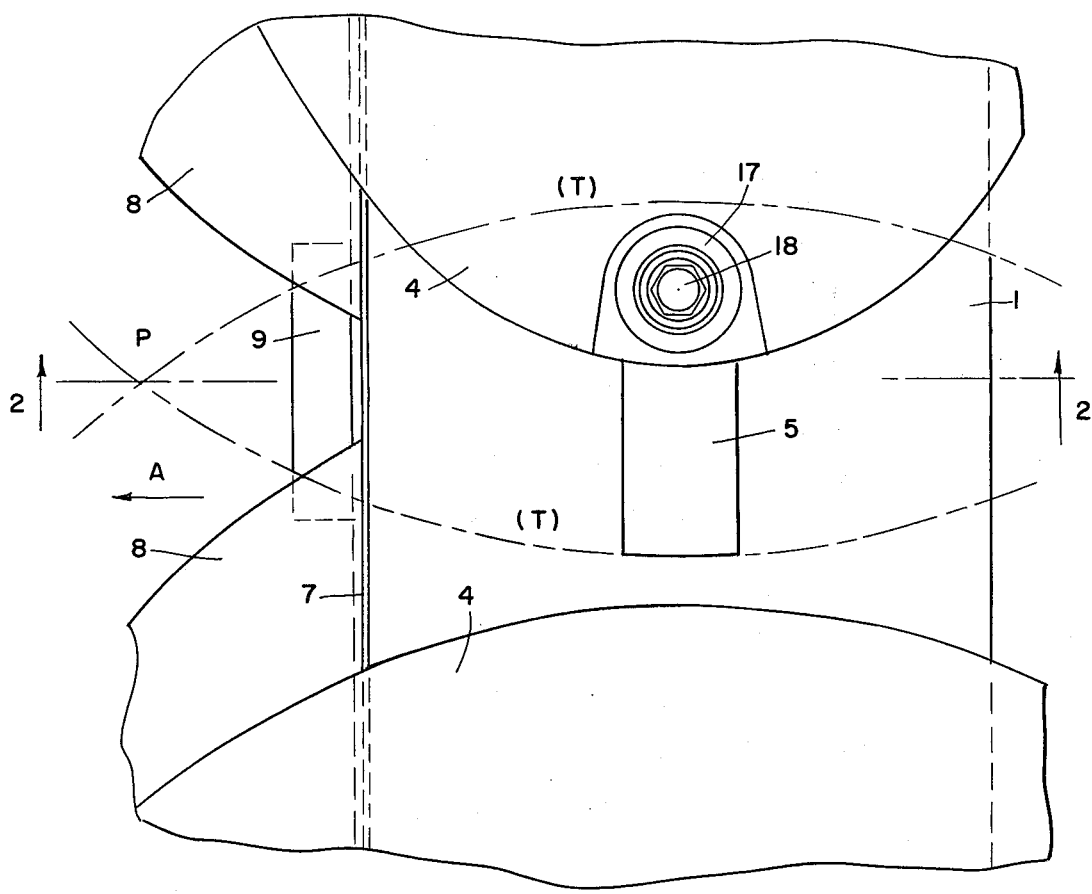
FIG. 3 is a top view of a casing zone between two neighbouring disks.

FIG. 3 is a top view of a part of the casing (1) lying between two neighbouring disks (4). Accumulations of earth picked up by the knives (5) when they encounter obstacles such as mole-casts for example, often form at these points on the casing (1). If these accumulations of earth project sufficiently far ahead of the casing (1) in the direction in which the mower is moving (arrow A) and extend beyond the forward point of intersection (P) of the paths (T) followed by the knives (5), the latter can no longer cut the forage encountered in these areas. To eliminate this drawback, scrapers (7) have been welded to the plate (7) in these zones. In accordance with one embodiment, the scrapers (9) can be fixed permanently to said plate (7). Viewed from above, the scrapers (9) have the shape of a rectangle whose breadth is at most equal to the distance separating the plate (7) and the point (P) and whose length is at least equal to the distance separating two neighbouring disk-protecting skids (8). Naturally, it is not necessary for the scrapers (9) to be so shaped as to present a rectangular face when viewed from above.

Figure 4:
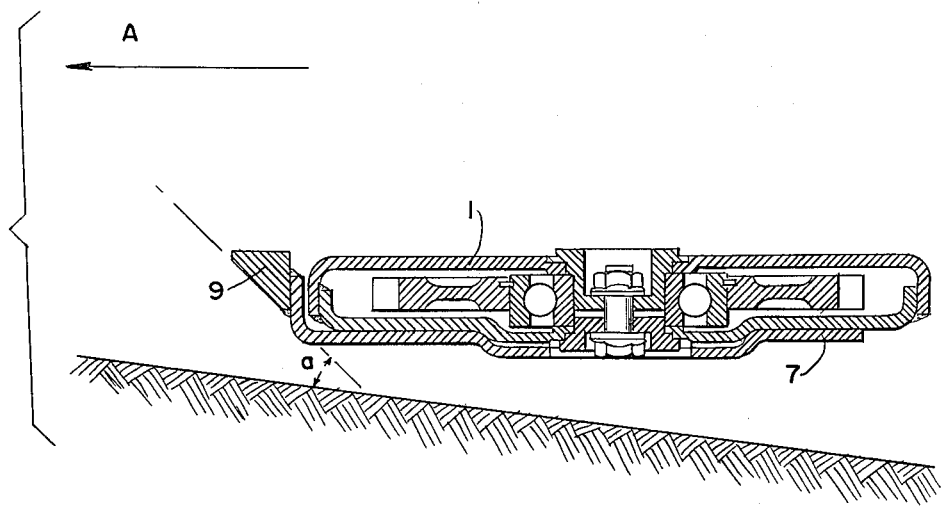
FIG. 4 is a sectional view of the casing in the plane containing the axis II—II defined in FIG. 1.

In FIG. 4, it can be seen that at the front, when viewed in the direction of the arrow A, the scrapers (9) exhibit a face inclined towards the ground and making an angle (a) with the plane of said ground. The scrapers (9) are fixed to the plate (7) such that the distance separating the upper face of said scraper (9) and the underside of the knives (5) is minimal. Thus, every time they pass, the earth stuck to the knives (5) is removed and slides downwards along the inclined face of the scrapers (9) without sticking to it.

It is important to note that said disk-protecting skids (8) and said scrapers (9) are attached to the plate (7) and not directly to the casing (1). Thus, any shocks that these disk-protecting skids (8) or these scrapers (9) are obliged to sustain are not transmitted directly to the casing (1) and, so, do not pose any threat to the sealing of the latter.

It is quite obvious that the preceding description only illustrates one embodiment example, it being understood that further modifications, improvements or additions could still be made to it without thereby going beyond the bounds of the present invention.

I claim:

1. In a mower movable in a predetermined direction including,
   a casing,
   a plurality of disks located above said casing each provided with cutting means,
   bearing block means supported by said casing, at least one of said disks being guided by said bearing block means,
   transmission means located in said casing for driving at least said one disk,
   the improvement comprising, a plate secured to said bearing block means; and disk-protecting skid means connected to and extending in front of said plate along said direction.

2. In a mower as claimed in claim 1, wherein said casing is elongated and said plate extends substantially over the entire length of said casing.

3. In a mower as claimed in claim 1, wherein said casing includes a lower face and said plate extends over the lower face of said casing.

4. In a mower as claimed in claim 1, wherein said plate substantially covers the edge of said casing which is forwardmost of said direction.

5. In a mower as claimed in claim 1, further comprising scrapper means extending in the area between two adjoining disks, and being secured to said plate.

6. In a mower as claimed in claim 5, wherein said scrapper means has a length at least equal to the distance separating two adjoining disk-protecting skids.

7. In a mower as claimed in claim 1, wherein said disk-protecting skid means are removably connected to said plate.

8. In a mower as claimed in claim 1, wherein said casing comprising an upper and a lower portion; further including a plurality of securing means interconnecting the upper and the lower portions of said casing and being operable to secure said bearing block means and said plate to said casing, and a plurality of bracing means each positioned adjacent a securing means and abutting the inner surfaces of the upper and lower portions of said casing, thereby bracing said casing.

9. In a mower as claimed in claim 8, wherein said bracing means surrounds said securing means.

10. In a mower as claimed in claim 9, wherein said bracing means further comprises sealing means.

11. In a mower as claimed in claim 10, wherein said bracing means have grooves in the upper and lower faces thereof, and said sealing means comprises O-rings lodged in said grooves.

12. In a mower as claimed in claim 9, wherein said bracing means is constituted by a synthetic material.

13. In a mower as claimed in claim 1, wherein the bracing means have the form of a cylindrical tube.

* * * * *